United States Patent
Rouchy et al.

(10) Patent No.: US 8,631,329 B2
(45) Date of Patent: Jan. 14, 2014

(54) METHOD AND DEVICE FOR THE RESTITUTION OF MULTIMEDIA DATA TRANSMITTED BY A GATEWAY TO A TERMINAL

(75) Inventors: Stephane Rouchy, Issy-les-Moulineaux Cedex (FR); Christophe Dion, Issy-les-Moulineaux Cedex (FR); Matthieu Malledant, Issy-les-Moulineaux Cedex (FR)

(73) Assignee: France Telecom, Paris (FR)

( * ) Notice: Subject to any disclaimer, the term of this patent is extended or adjusted under 35 U.S.C. 154(b) by 875 days.

(21) Appl. No.: 11/993,568

(22) PCT Filed: Jun. 8, 2006

(86) PCT No.: PCT/EP2006/063031
§ 371 (c)(1),
(2), (4) Date: Aug. 21, 2008

(87) PCT Pub. No.: WO2006/136501
PCT Pub. Date: Dec. 28, 2006

(65) Prior Publication Data
US 2010/0138469 A1    Jun. 3, 2010

(30) Foreign Application Priority Data
Jun. 22, 2005    (FR) ...................................... 05 06351

(51) Int. Cl.
*G06F 15/177*    (2006.01)
*G06F 15/16*    (2006.01)

(52) U.S. Cl.
USPC ........... 715/733; 709/201; 709/217; 709/218; 709/219; 709/231

(58) Field of Classification Search
USPC .......................... 709/217, 218, 231–232, 203
See application file for complete search history.

(56) References Cited

U.S. PATENT DOCUMENTS

| | | | | |
|---|---|---|---|---|
| 5,909,183 | A * | 6/1999 | Borgstahl et al. | 340/825.22 |
| 6,470,378 | B1 * | 10/2002 | Tracton et al. | 709/203 |
| 6,477,529 | B1 * | 11/2002 | Mousseau et al. | 1/1 |
| 6,826,597 | B1 * | 11/2004 | Lonnroth et al. | 709/207 |
| 6,981,029 | B1 * | 12/2005 | Menditto et al. | 709/217 |
| 7,739,658 | B2 * | 6/2010 | Watson et al. | 717/108 |
| 2003/0228866 | A1 | 12/2003 | Pezeshki | 455/422.1 |
| 2004/0128342 | A1 * | 7/2004 | Maes et al. | 709/200 |
| 2008/0194208 | A1 * | 8/2008 | Tischer et al. | 455/68 |

OTHER PUBLICATIONS

French Search Report from counterpart foreign Application No. FR 05/06351.

(Continued)

*Primary Examiner* — Saleh Najjar
*Assistant Examiner* — Feliciano Mejia
(74) *Attorney, Agent, or Firm* — David D. Brush; Westman, Champlin & Koehler, P.A.

(57) ABSTRACT

A method is provided for the restitution of multimedia data transmitted by a gateway to a communications terminal via a first transmission channel. The method includes the following steps: interrogating the terminal via the gateway about its capabilities of restituting the multimedia data; transmitting, to the gateway via the terminal, a list of commands that it is capable of executing; transmitting, via the gateway, multimedia data with the aid of at least one series of commands that is part of the list of commands that can be executed by the terminal, and restituting, in this terminal, the multimedia data with the aid of the received command.

12 Claims, 6 Drawing Sheets

(56) References Cited

OTHER PUBLICATIONS

International Search Report from counterpart foreign Application No. PCT/EP2006/063031.

English Translation of International Preliminary Report on Patentability—Written Opinion of Sep. 28, 2006 for corresponding International Application No. PCT/EP2006/063031, filed Jun. 8, 2006.

* cited by examiner

METHOD AND DEVICE FOR THE RESTITUTION OF MULTIMEDIA DATA TRANSMITTED BY A GATEWAY TO A TERMINAL

CROSS-REFERENCE TO RELATED APPLICATIONS

This Application is a Section 371 National Stage Application of International Application No. PCT/EP2006/063031, filed Jun. 8, 2006 and published as WO 2006/136501 on Dec. 28, 2006, not in English.

FIELD OF THE DISCLOSURE

The field of the disclosure is that of the rendering of multimedia data by terminals from a gateway. More specifically, the disclosure relates to the rendering of multimedia data on heterogeneous terminals, and especially on terminals with limited processing capacity such as telephone terminals or remote control units.

The great majority of communications terminals have technical characteristics, especially in the form of a screen and speakers, by which they render multimedia data. However, these characteristics may vary substantially from one terminal to another. For example, present-day telephones generally have a screen but this screen does not provide for the restitution of all types of images. Certain screens can be used to display solely images of small format and/or low-quality animation. Others can be used for the higher-quality display of films.

Multimedia data for their part vary greatly, in terms of both format and size, and require restitution means that are very different from one another.

BACKGROUND OF THE DISCLOSURE

Consequently, the manufacturers of terminals are constantly improving their capacities by adding ever more powerful processing means, higher-capacity memories, screens of better definition etc. This is leading to an increase in the complexity, weight and above all the cost of the terminals.

Furthermore, mechanisms for graphic display forwarding have been proposed in which a server asks the customer known as a "thin" customer to execute display operations, on its behalf, on a screen. These graphic display forwarding mechanisms enable execution of programs that contain simplified graphic interfaces on a computer and restitute the display of these programs on a remote terminal.

This approach, which is the one used by the X-Windows (registered mark) system especially has a classic customer/server architecture used for the display, on an X terminal, of applications working in any host system or application server whatsoever. The application server comprises a customer application and a customer library for communications with the X server.

The remote terminal (X terminal) must have, at the minimum, capacities for management of applications windows (X server) and a video driver carrying out displays of windows on the terminal. The information coming from the application server is restituted after processing for display by the remote terminal. The information exchanges are done on a standard network by means of the TCP/IP communications protocol.

One drawback of this prior art technique is that these display forwarding mechanisms are not suited to the ultra-thin terminals (for example a home telephone or remote control unit) having very limited information-processing capacities and no advanced software environments. Indeed, in order to function, an Xterminal, such as the one referred to here above, requires a non-negligible minimum hardware configuration to enable it to execute the software programs such as an Xserver or its equivalent.

Another drawback of these prior art techniques is that the software cannot be fragmented within the communications terminal. The software program must be integrally present so that the terminal can process the information that comes to it.

Another drawback of this prior art technique is related to the limitation of the bandwidth. Indeed, to display data from the remote application, the terminal must receive a major volume of information resulting in either the congestion of the communications network used to transmit information or in it's becoming technical impossible for the remote terminal to take charge of the information transmitted to it.

To overcome these prior art drawbacks, methods have been set up, for example the creation of buffering (proxy) used to store information coming from the server while the terminal has time needed to process the information it has already received. Certain methods also consist of an improvement of the communications protocols used or an increase in the capacities of the remote communications terminal. These specific methods however add further to the complexity of the system.

Yet another drawback of these prior art techniques is that the display performances, especially the speed and fluidity of the applications working on the terminal, are strongly linked to the capacities of the graphic devices contained in the terminal.

These drawbacks are reinforced in remote communications because, in certain places and/or in certain situations, the infrastructure of the information transmission channels does not provide for efficient information processing even if, in absolute terms, the terminal allows it.

Finally, these techniques remain complex and costly and imply firstly a specific infrastructure and, secondly, techniques that use fairly heavy means.

SUMMARY

A method is provided for the restitution of multimedia data transmitted by a gateway to a communications terminal, through a first transmission channel.

A method of this kind comprises the following steps:
  interrogating said terminal via said gateway on its capabilities of restitution of said multimedia data;
  transmitting to said gateway, via said terminal, a list of commands that it is capable of executing;
  transmitting, via said gateway, multimedia data by means of a least one sequence of commands forming part of said list of commands executable by the terminal;
  restitution in said terminal of said multimedia data by means of said received command or commands.

Thus, an embodiment of the invention relies on a novel approach to the restitution of multimedia data intended for a communications terminal according to which a terminal is preliminarily interrogated on its own capabilities and means in order to ensure that it is always able to restitute said data.

In other words, an embodiment of the invention relies on a dynamic approach to the restitution of multimedia data in taking account of the capabilities of restitution of the terminal. Thus, the gateway sends the terminal only commands that said terminal is able to execute.

This means that, for a same restitution of multimedia data, two different terminals will not necessarily receive the same commands from the gateway.

An embodiment of the invention therefore makes it possible, inter alia, to dynamically distribute the processing operations according to the capabilities of the terminal (memory, CPU etc) and/or the load of the communications network (bandwidth etc).

Preferably, the restitution of multimedia data comprises a step of conversion of at least one complex command, not present in said list, into at least one command present in said list.

Thus, when a terminal is not capable, through its own capabilities, of reproducing a complex restitution command, this step enables the gateway to compute a sequence of simple commands to be executed by the terminal so that this terminal can nevertheless restitute the multimedia data.

This step, here below called an interpolation step, can be used for example by the gateway to replace a command for display of a circle, which is complex for the terminal considered, by a sequence of commands for the display of dots on the screen, thus producing the desired circle.

Advantageously, the restitution of multimedia data includes a step of selection of a set of at least one command to be transmitted to said terminal, from among at least two possible sets of at least one command used to perform a predetermined operation.

Thus, for example, when a same multimedia data element can be produced by the terminal in several different ways, the gateway is capable of making a choice from among these different possibilities. For example, if the multimedia data element to be restituted by the terminal is a circle, and if the circle has functions available for displaying dots on the screen and for displaying images on the screen, then the gateway has two possibilities for displaying a circle:

transmitting the circle to be displayed dot by dot to the terminal;

transmitting an image of this circle so that the terminal displays the image directly;

Different criteria of selection of one of the possibilities can be envisaged.

Advantageously, the selection step takes account of statistics to determine the set of commands showing the best performance according to a predetermined criterion.

These statistics can be managed by the gateway in order to give it relevant criteria of choice when it is in a position to ask for the restitution of the multimedia data in several different ways.

Thus, in taking up the example of the display of the circle, and in having statistics available, the gateway is capable of making a more judicious choice of the sets of commands to be transmitted, for example by comparing the respective times of display of a set of dots and of an image.

Advantageously, said predetermined criterion can also take account of a piece of information representing a level of activity of said terminal.

This level of activity can be represented by average values of execution times for commands sent to the terminal or again by an indication on the level of load of the processor of the terminal. This level of activity may also for example be based on the memory volume necessary for the terminal to perform the requested operation.

Preferably, said predetermined criterion also takes account of a piece of information representing said first current transmission channel and/or a piece of information representing the effective bit rate available between said gateway and said terminal and/or availabilities (in terms of memory and processing) of the terminal at a given point in time.

This information representing said first transmission channel advantageously has an indication of the type of communications standard available for said terminal, for example Bluetooth, WiFi, Ethernet (registered marks). It is thus possible to determine a list of commands to be transmitted to the terminal as a function of a volume of data necessary to transmit the commands.

Advantageously, the method comprises at least two steps of restitution of the multimedia data respectively for at least two terminals simultaneously.

Thus, it is possible to carry out the restitution of multimedia data on several terminals simultaneously. The gateway can for example command the restitution of a first multimedia data stream to a first terminal while at the same time commanding the restitution of a second multimedia data stream to a second terminal.

An embodiment of the invention also relates to gateways implementing the above-described method.

Advantageously, a gateway of this kind comprises means of conversion of at least one command not present in said list into at least one command present in said list.

Preferably, a gateway of this kind also has means of selection of a set of at least one command to be transmitted to said terminal, from among at least two possible sets of at least one command enabling a predetermined operation to be performed.

An embodiment of the invention also relates to the terminals implementing the above-described method as well as to the corresponding computer programs.

BRIEF DESCRIPTION OF THE DRAWINGS

Other features and advantages shall appear more clearly from the following description of a preferred embodiment, given by way of a simple illustrative and non-restrictive example, and from the appended drawings, of which.

DETAILED DESCRIPTION OF ILLUSTRATIVE EMBODIMENTS

1. Reminder of the Principle of an Embodiment of the Invention

In the context of an exemplary embodiment of the present invention, the description therefore focuses on the rendering of complex multimedia data by means of an ultra-thin communications terminal, on the basis of the capabilities of said terminal and as a function of parameters, and especially the current state of a transmission channel transmitting to said terminal, and/or the performance of the terminal.

The term "ultra-thin terminal" is understood here to mean a telephone or a remote-control unit.

The general principle of an embodiment of the invention therefore relies on the taking into account of the capabilities of the terminal in order to give it simple commands, which it is always capable of executing. This sequence of simple commands is computed by a gateway and dispatched to the terminal. The execution of all these simple commands enables the terminal to restitute the complex multimedia data, which it would be incapable of doing had it been obliged to carry out the restitution processing solely through its own capabilities.

The gateway, which is present for example at the home of a person with a terminal, comprises processing means (for carrying out the necessary processing operations) and connection means, as the case may be, to promote servers, for example by means of a connection to the Internet.

Figure 1:
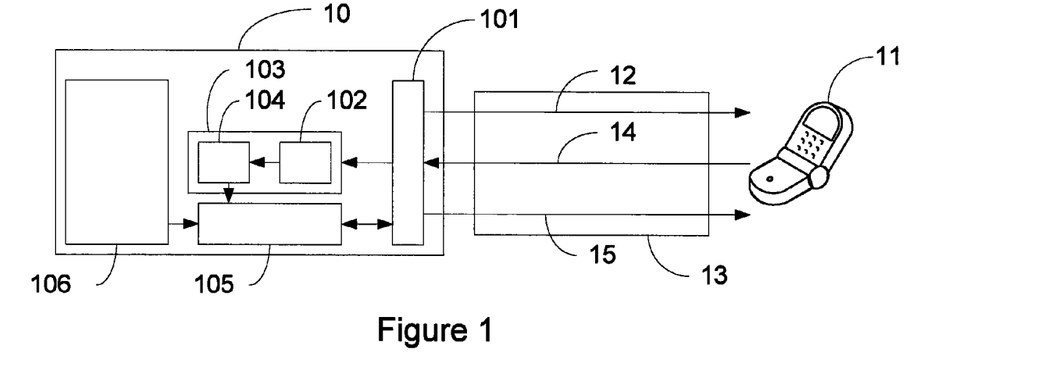
FIG. 1 is a block diagram showing the processing of the restitution of multimedia data transmitted by a gateway to a communications terminal via a transmission channel in order to prompt an optimized rendering of said data according to an embodiment of the invention.

FIG. 1 is a simplified illustration of an exemplary architecture implementing an embodiment of the invention. According to this embodiment of the invention, the gateway 10 sends out a request 12 addressed to a communications terminal 11 through a transmission channel 13 in using the communications server 101 called a dispatcher.

Figure 6:
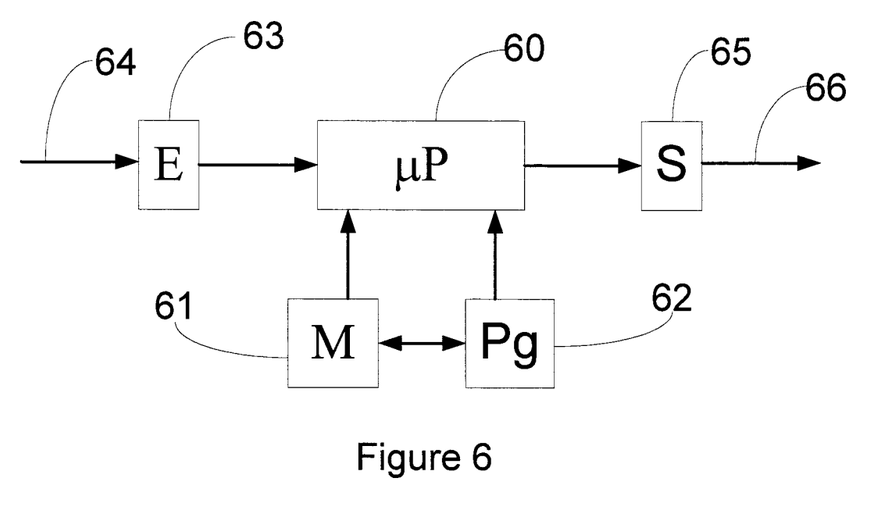
FIG. 6 provides a schematic illustration of the hardware structure of the terminal of FIG. 1.

The structure of the terminal 11 is illustrated schematically in FIG. 6. It comprises a computer-readable support, including a memory M 61, and a processing unit 60 equipped with a microprocessor µP, that is driven by a computer program (or application) Pg 62 stored in the computer-readable support. At input, the processing unit 60 receives server commands 64 through a network input interface module E 63. The microprocessor µP processes these server commands 64 according to the instructions of the program Pg 62, to generate requests and/or responses 66 which will be transmitted through a network output interface module S 65.

Figure 7:
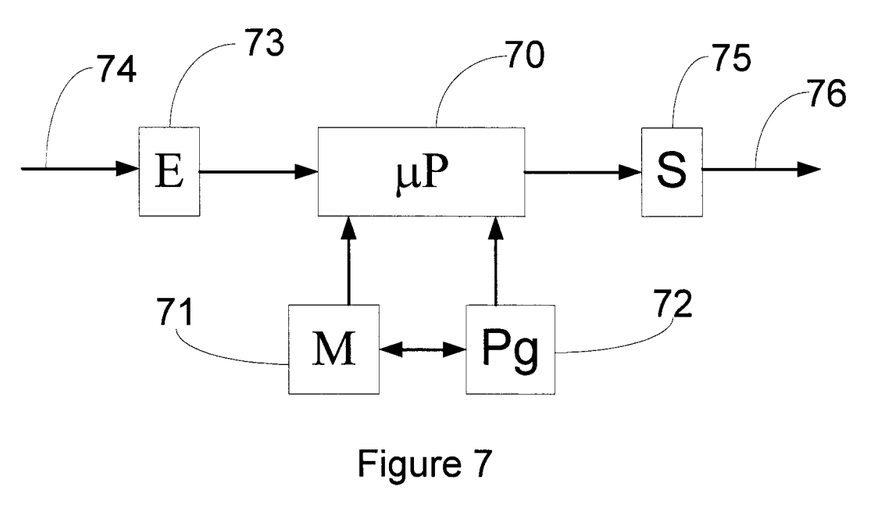
FIG. 7 provides a schematic illustration of the hardware structure of the gateway of FIG. 1.

The structure of the gateway 10 is illustrated schematically by FIG. 7. It comprises a computer-readable support, including a memory M 71, and a processing unit 70 equipped with a microprocessor µP that is driven by a computer program (or application) Pg 72 stored in the computer-readable support. At input, the processing unit 70 receives client requests and/or responses 74 through a network input interface module E 73. The microprocessor µP processes these client requests and/or responses 74 according to the instructions of the program Pg 72, to generate requests and/or responses 76 which are transmitted through a network output interface module S 75.

The request 12 asks the terminal 11 to provide the gateway 10 with a list of restitution commands 102, in the form of a response 14, that it is capable of executing. Such a list may contain a set of commands whose volume is greater or smaller depending on the capabilities of the terminal. This list may include commands such as:
- <<displaypixel>>, to display a pixel on the screen of the terminal;
- <<displayimage>> to display an image on the screen of the terminal;
- <<playnote>> to play a musical note on the speaker of the terminal;

A prompting request may also be sent out by the terminal when the user wishes to obtain information. This prompting request is then a step that is additional and preliminary to the exchange of a list between the gateway and the terminal.

The gateway 10 stores the list 102 of commands executable by the terminal 11 within a server of correspondences of multimedia libraries 103 and builds an interpolation table 104, used to convert each complex command non-executable by the terminal into a sequence of simple commands executable by the terminal.

The integration table 104 is then used within an execution environment 105 (application server for example), by one or more applications, 2 restituted the multimedia data 106 in the form of a list of simple commands 15 which will be executed by the communications terminal 11.

The communications terminal makes its responses and command acknowledgements reach the gateway; these acknowledgements may be used for example by the server 103 to complement the list of commands 102 and the interpolation table 104 with information on the speed of execution of the commands sent to the terminal. This statistical information can then be used during following dispatches of commands to define the best commands (those having faster execution) to be sent to the terminal.

The multimedia data 106 may, for example, of a textual, photographic, videographic, musical, vibratory or odoriferous type and may include combinations of these types. They may, without distinction, be stored in the server, converted and transmitted to the terminal or again come from another environment be only converted by the server and sent to the terminal.

A particular example of implementation of the process of FIG. 1 can be obtained from the following technical pedestal which comprises:

a gateway 10, comprising:
- a communications server 101 managing the communications between the server and the terminals. It is responsible for transmitting the data from the gateway 10 to the terminals and vice versa. It is this communication server that dispatches requests and/or commands and checks in the responses and/or the acknowledgements from the terminals;
- a server of correspondences of multimedia libraries 103, responsible for setting up interpolations between the simple commands and the complex commands pertaining to restitution of the multimedia data. This server may be used in the form of an application functioning in a Java virtual machine. It is the server that receives the list 102 and builds the interpolation table 104 that is used thereafter. The interpolation table may be built out of an internal database 103 proper to the server or again it may be built out of a remote database accessible via the Internet.
- an application server 105 responsible for executing the applications of restitution of the multimedia data from information provided by the correspondence server and of transmitting the result of its processing operations to the Communications server with a view to execution by the terminal 11.

In one alternative embodiment of the invention, it is also possible not to implement the application server 105 within the gateway 10 and to use a remote application server, present in the internal network for example, to execute the applications;

a communications terminal 11, comprising:
- communications capacities used to accept commands and provide responses to the gateway 10;
- capacities of execution of multimedia data restitution commands.

2. Architecture of the Terminal

Figure 2:
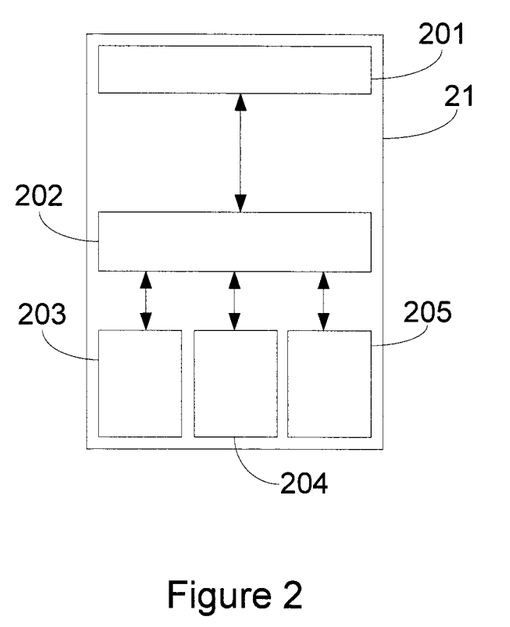
FIG. 2 illustrates the software architecture enabling the restitution of the multimedia data by the terminal.

According to an embodiment of the invention, the terminal 11 has means of communication with the gateway 10. These means of communication induce a particular architecture for this terminal. An example of terminal architecture is illustrated in FIG. 2.

This terminal 21 comprises:
- a communications module 201 enabling the terminal 21 to communicate with the gateway 10. This module receives the requests and commands coming from the server and transmits the responses of the terminal 21 to the gateway 10. This module may communicate, for example, according to the "BlueTooth", "WiFi", "Ethernet", infrared, and other standards.
- A module 202 for the processing of multimedia data restitution commands called a "client dispatcher". This module checks in the reception of commands from the communications module 201 and distributes them to the different driving units for driving the functions of the communications terminal. These driving units may be:
- a terminal graphic display management unit 203;
- a terminal keyboard management unit 204;
- a terminal speaker management unit 205.

These units execute the commands which are transmitted by the "client dispatcher" 202.

In one alternative embodiment of the invention, it is also possible that the terminal will include software programs or applications, for example the management of a telephone directory that can be driven by the gateway 10.

In another alternative embodiment of the invention, the gateway 10 may do without the services of the "client dispatcher" and communicate its instructions directly to the driving units or to the applications present at the terminal.

Here below, we shall present especially the particular case of a gateway 10 connected to the Internet and communicating with several communications terminals. It is clear however that the invention is not limited to this particular application but can also be implemented in many other fields, for example in mobile telephony and more generally whenever the goals listed here below are interesting.

3. Description of an Embodiment

Figure 3:
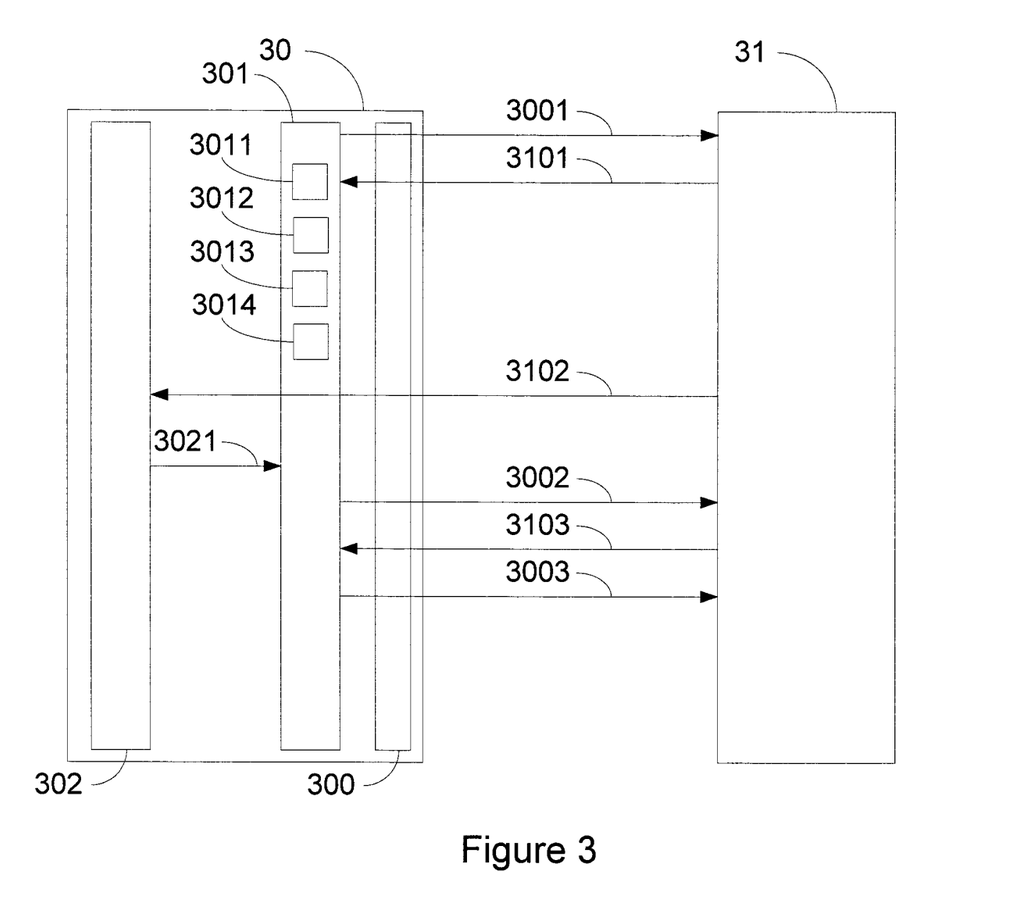
FIG. 3 describes the software structure of the information and processing stream leading to the restitution of the multimedia data by the terminal.

Referring to FIG. 3, an embodiment is presented of the method of restitution of graphic data transmitted by a gateway to a communications terminal. This embodiment is illustrated by means of examples of commands and responses indicated in italics.

The principle of the embodiment of this system is the following:
- The user activates a communications terminal 31;
- The home gateway 30 initializes the terminal (communications command init( )) 31 when it is activated (response init_result_event);
- The gateway 30 interrogates 3001 via its management server, the server of correspondences of graphic libraries 301 and, via its communications server 300, the communications terminal 31 to know its capabilities of graphic restitution (command get_command_list( )); the gateway can also interrogate the terminal on its other restitution capabilities by means of other servers for the management of multimedia library correspondence.
- The terminal 31 formulates a response 3101 in the form of a list of graphic commands which it is in a position to accept (response get_command_list_result_event);
- The server 301 stores this list of commands accepted by the terminal 3011.
- The server 301 builds an interpolation table 3012 of the commands not recognized by the terminal from the list of simple commands 3011.
- It is also possible, in another embodiment, for the gateway to ask the terminal for a manufacturer's identifier and model identifier. In this case, the terminal sends back these two pieces of information. The gateway will then be responsible, through an Internet connection for example, for the retrieval, from a database, of all the capabilities of restitution of the terminal, as well as an interpolation table already built for this terminal.
- The server 301 then sets up a statistics table 3013 pertaining to time of execution of each command by the terminal.
- The server 301 again constitutes a table of commands under execution 3014 in order to have precise knowledge of the state of the commands in the terminal;
- The environment necessary for the restitution is then in position.

In another embodiment, the statistics table 3013 may be transmitted in a pre-filled state to the gate 30, via an Internet connection for example, in order to derive advantage from experiences of previous measurements of performance of the different commands.

In a second stage, the terminal 31 requests (3102) the gateway for the graphic rendering of an application, for example by pressing a key on the terminal.

The gateway 30, using its application server 302:
- executes the part of the program necessary for the graphic rendering;
- sends a list of restitution commands 30 21 to the graphic libraries correspondences server 301, The gateway 30, in using the graphic libraries correspondences server 301:
- converts complex commands by means of the interpolation table 3012. The conversion may take account of the available bit rate between the gateway and the terminal as well as mean execution times detected by means of the statistics table 3013. The conversion may, for example, consist of a conversion of a circle into a set of dots;
- updates the table of commands being executed 3014 with the set of commands coming from the interpolation;
- transmits 3002 to the terminal the commands used to command the restitution of the graphic data on the terminal;

The terminal 31:
- executes the commands transmitted by the gateway;
- transmits 3103 acknowledgements to signify the efficient execution of the commands or notifications of error if the execution of the commands is not possible;

At the reception of these acknowledgments, the gateway 30, by means of the graphic libraries correspondence server 201:
- updates the measured execution time of each command in the table of statistics 3013;
- withdraws each accurately executed command from the list of commands being executed;
- Retransmit 3003 the commands that it was not possible to execute previously.

In an alternative embodiment of the invention, it is possible that the graphic libraries correspondences server 301 will send the graphic restitution commands to the terminal one by one. In this case, it awaits reception of the acknowledgement from the terminal to transmit the next command, and so on and so forth until the execution of all the planned commands. This implementation is particularly well suited to terminals having very low capacities.

It is also possible to couple the two preceding modes of implementation into a new one that the server of graphic library correspondences 301 to adapt dynamically to the terminal 31 as a function, for example, of a number of received errors exceeding a certain threshold and/or implementing a new table of error return statistics and/or capacities at a given point in time of the terminal and/or the current state of the transmission channel.

In one alternative embodiment of the invention, it is also possible not to implement the application server 302 within the gateway 30 and use a remote server, present in the Internet for example, to execute the applications.

4. Description of the Communications Server

Figure 4:
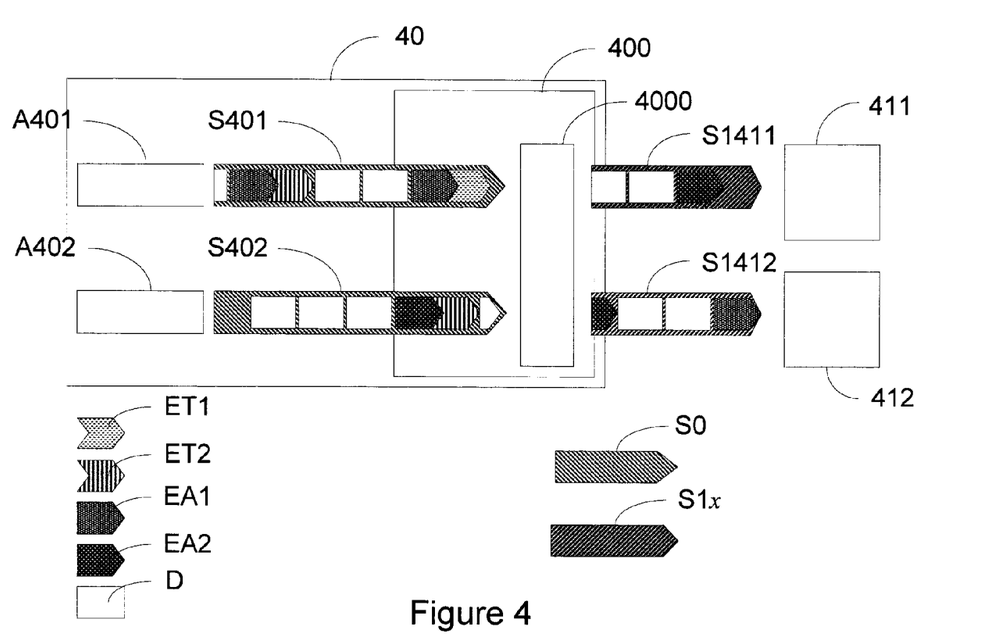
FIGS. 4 and 5 describe the protocol used as a communications base between the gateway and the terminal.

Referring to FIG. 4, we present an embodiment of the protocol of the communications server 400 used to bring commands to one or more terminals 41x from the gateway 40.

In this representation, the gateway 40 executes two applications A401 and A402 within itself. Each of these applications communicates schematically speaking in the form of a reserved communications channel Sx "socket". S401 is the communications channel of the application A401 and S402 is the communications channel of the application A402. Each application causes the circulation of data addressed to the communications server or dispatcher 400 in its own communications channel. It can also be envisaged that the applications will share only one communications channel addressed to the server 400.

The pieces of data transmitted by each application in this channel are called frames. These frames consist of:
An application header $EA_x$;
a terminal header $ET_x$;
Own data subdivided into packets D.

In this representation, there are two types of application headers EA1 and EA2 each corresponding to the application A401 and A402. There are also two types of terminals ET1 and ET2 each corresponding to the application 411 and 412.

The dispatcher 400 has several communications interfaces $S1_x$ enabling it to transmit data to the terminals. These communications interfaces may for example be of the BlueTooth, WiFi, Ethernet or other type. In our representation, the "dispatcher" has activates two interfaces.

S1411 between the gateway 40 and the terminal 411;
S1412 between the gateway 40 and the terminal 412.

The method of distributing information and data to the terminals is the following:

Each application A401 and A402 sends frames having 2 headers and data:
The first header identifies the client that is the intended recipient of the message and contains the identifier of the terminal;
The second header identifies the application dispatching the message.
The dispatcher checks in these frames and identifies the destination terminal by means of the first header;
It eliminates this first header in order to minimize the volume of the data to be transmitted;
It sends the remaining frame, i.e. the second header and the data to the desired recipient in passing through the corresponding communications interface.
The intended recipient's terminal will analyze the frames received and will identify the application by means of the application header.

In another embodiment, it is possible to leave the header of the terminal in the frame sent by the dispatcher to the terminal in order to overcome, as the case may be, the problems related to the presence of two identical terminals connected at a same instant t to the gateway.

In yet another embodiment, it can be envisaged not to include the application header and/or terminal header in the data frames when there is, for example, only one terminal connected to the gateway when the gateway executes only one application.

Figure 5:
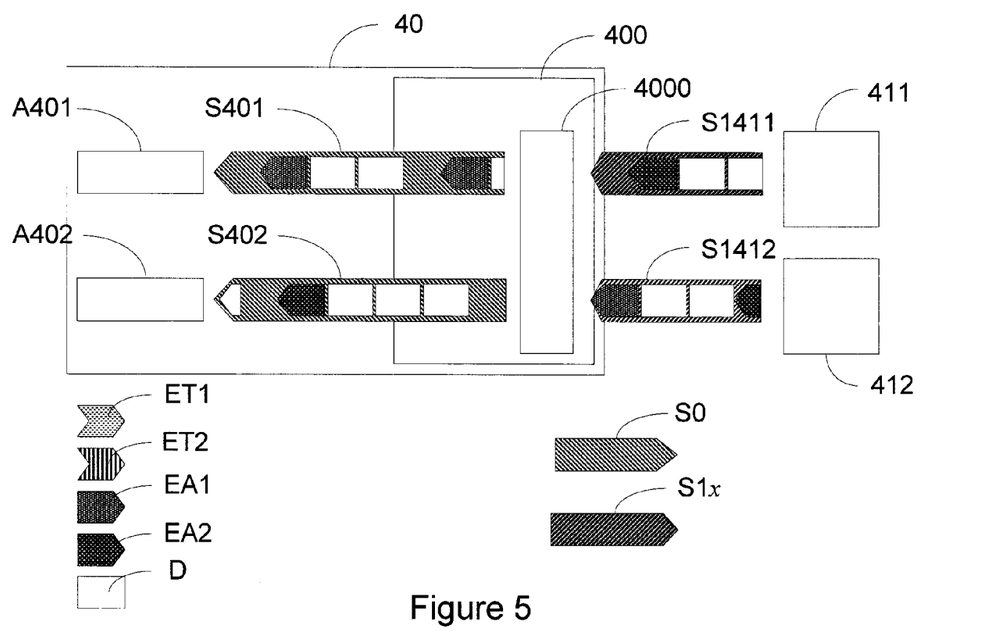

The sending back of information (acknowledgements, responses to requests) by the terminals works according to the same principle as illustrated in FIG. 5, except that the terminals cannot include the header identifying the terminal in the frames returned to the server 400.

5. Description of the Data Frames and of the Commands

The transfer of information between the gateway and the terminals is defined by the principle of the data frames comprising headers used to identify the respective intended recipients of the data packets of the frame. In a particular embodiment of the invention, linked to the restitution of graphic data, two types of packets are distinguished:
The commands: packets sent by the server of graphic library correspondences to the terminal which can be subdivided into three categories:
Commands without response: simple requests that do not require any response from the terminal;
Command with response: requests calling for a response from the terminal (in the form of a response event);
Command with acknowledgement: requests asking for acknowledgement by the terminal.
Most of the commands are of the type "with response" or "with acknowledgement".
Events: packets sent by the terminal to the server of graphic libraries correspondences which can be subdivided into three categories:
Response event: this category of events is used by the terminal to respond to commands with responses. They also serve as acknowledgements for these commands;
Autonomous event: events that are not attached to any command and generally describe the state of the terminal or an action of the user on the terminal (keycode, etc);
Acknowledgements: minimum packets sent by the terminal to the server of graphic library correspondences to acknowledge a command with acknowledgement.

The operating model chosen in this embodiment is a master-slave model. The server of graphic library correspondences is the master and the terminal is a slave with the possibility that the latter can send autonomous events. Thus, the terminal cannot send a packet requesting a response from the server of graphic library correspondences. It is the server that asks for acknowledgement from the terminal.

Figure 8:
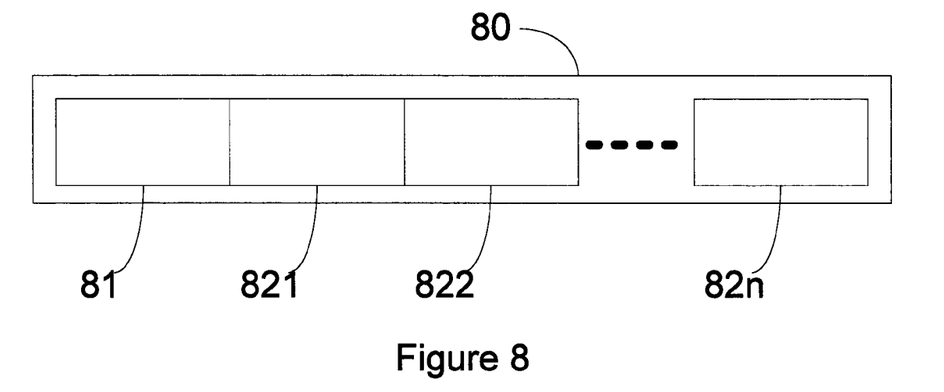
FIGS. 8 and 9 describe the structure of the control packets as well as the structure of the control headers transmitted by the gateway to the terminal.
Figure 9:
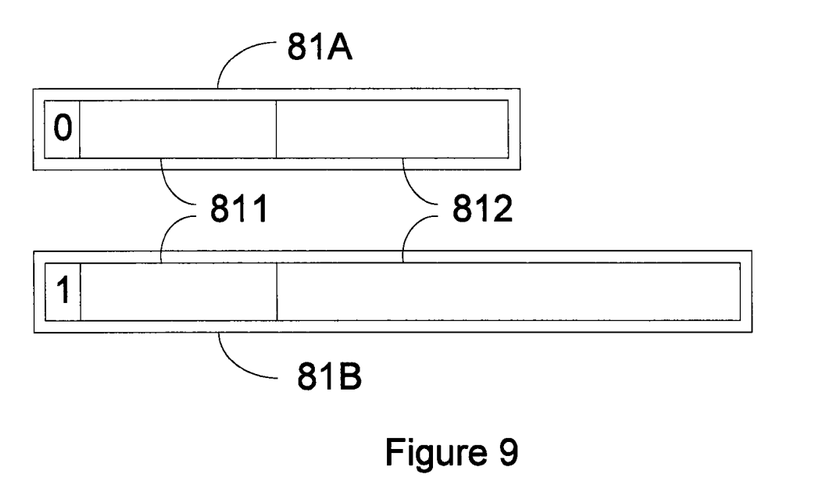

Referring to FIGS. 8 and 9, we furthermore present a structure of command packets as well as the structure of the headers of the commands.

The command packets 80 are defined by:
a header 81 whose length is variable in order to reduce the resources necessary according to the commands to be sent. For example, for a pixel command that requires only two parameters(x, y), the request header will be short.
a determined number of parameters $82x$, depending on the command contained in the packet.

In this implementation, the total length of the parameters is a whole number of bytes defined in the header 81. The length of each parameter is also a whole number of bytes. Certain parameters can be subdivided into sub-parameters. In this case, the significance of each bit of the corresponding bytes is defined.

The header 81 is formed:

by an operation code named "opCode" 811, represented on a byte for which the first bit of the opCode (0 or 1) makes it possible to distinguish the two types of header, thus enabling the management of:

128 short commands, requiring no parameter or few parameters (header 81A). The field length of the parameters 812 is therefore one byte long.

32 long commands, requiring a substantial number of parameters (header 81B). The field length of the parameters 812 is therefore two bytes long.

a whole number of bytes (one of a whole number of bytes (1 or 2), depending on the value of the first bit of the opCode;

The following is a non-exhaustive list of short commands that can be processed by the terminal:

| Command | op Code | Command description summary |
|---|---|---|
| init | 0x00 | initialize terminal |
| standby_mode | 0x01 | Activate/deactivate standby mode |
| display_mode | 0x02 | Activate/deactivate back display |
| set_color_mode | 0x03 | Select screen color number |
| set_contrast | 0x04 | Selection screen contrast level |
| set_style | 0x05 | Selection drawing color and style |
| draw_pixel | 0x06 | Draw a pixel |
| draw_line | 0x07 | Draw a line |
| draw_rect | 0x08 | Draw empty rectangle |
| fill_rect | 0x09 | Draw full rectangle |
| draw_round_rect | 0x0A | Draw round empty rectangle |
| fill_round_rect | 0x0B | Draw round full rectangle |
| draw_arc | 0x0C | Draw.ellipse arc |
| fill_arc | 0x0D | Draw full ellipse portion(angle sector) |
| fill_triangle | 0x0E | draw a full triangle |
| get_font_info | 0x0F | Ask for characteristic size of specified font |
| copy_area | 0x10 | Copy screen rectangular area of screen |
| get_display_info | 0x11 | Request information on terminal display unit |
| refresh | 0x12 | Set display unit to take account of plotting in case of double-buffer display unit |
| set_clip | 0x13 | Select clip area |
| get_terminal_info | 0x14 | get terminal information |
| get_battery_level | 0x15 | get terminal battery level |
| get_signal_level | 0x16 | get information on reception signal power |
| set_audio_gain | 0x17 | define sound levels |
| set_led | 0x18 | fix state of light-emitting diodes |
| get_command_list | 0x19 | get list of supported commands |
| close | 0x1A | close session |

The following is a non-exhaustive list of the lengthy commands that can be processed by the terminal:

| Command | opCode | Command description summary |
|---|---|---|
| draw_polyline | 0x80 | Draw several adjacent segments |
| draw_chars | 0x81 | Display string of characters |
| set_area | 0x82 | Display an image |
| get_char_width | 0x83 | Get pixel length of a string of characters |
| play_melody | 0x84 | Launch play of melody on terminal |
| play_tone | 0x85 | |

The following is a non-exhaustive list of <<response event>> that can be returned by the terminal:

| Events | code | Summary of description of the event |
|---|---|---|
| init_result_event | 0x00 | Indicates if terminal ready or not. |
| standby_mode_result_event | 0x01 | Indicates result of command standby_mode. |
| display_mode_result_event | 0x02 | Indicates result of command display_mode. |
| set_color_mode_result_event | 0x03 | Indicates result of command set_color_mode. |
| get_font_info_result_event | 0x0F | Returns characteristic font sizes |
| get_display_info_result_event | 0x11 | Returns info on terminal display unit |
| get_terminal_info_result_event | 0x14 | Returns characteristics of the terminal |
| get_battery_level_result_event | 0x15 | Returns info on battery level |
| get_signal_level_result_event | 0x16 | Returns signal power at reception. |
| get_command_list_result_event | 0x19 | Returns list of commands supported. |
| get_char_width_result_event | 0x83 | Returns string length in pixels |

It is clear that the invention is not limited to the descriptions of the embodiment. The commands and the response events can be extensively complemented according to the characteristics of the terminals and the servers managing the communications with the terminals.

An aspect of the disclosure provides a technique for rendering complex multimedia data that is adapted to the heterogeneous processing capacities of different terminals, particularly adapted to so-called ultra-thin terminals.

An aspect of the disclosure enables the implementation of an architecture for the fragmentation of the software programs used by the ultra-thin communications terminal.

An aspect of the disclosure enables the implementation of an architecture that overcomes bandwidth limitations without making use of complementary mechanisms.

An aspect of the disclosure provides maximum performance for applications for rendering multimedia data.

In other words, an aspect of the disclosure provides a technique of this kind that can used to effect operation of multimedia rendering applications optimally even with reduced capacity.

An aspect of the disclosure provides a technique of this kind that can be used to optimize the processing operations performed by each terminal according to its capacities.

Furthermore, an aspect of the disclosure provides a technique of this kind to provide low-cost, ultra-thin terminals without complex processing means in a simple and efficient way.

Although the present disclosure has been described with reference to one or more examples, workers skilled in the art will recognize that changes may be made in form and detail without departing from the scope of the disclosure and/or the appended claims.

The invention claimed is:

1. Method for the restitution of multimedia data transmitted by a gateway to a communications terminal, through a first transmission channel, wherein said method comprises:

interrogating said terminal via said gateway on the terminal's capabilities of restitution of said multimedia data;

transmitting to said gateway, via said terminal, of a list of restitution commands that the terminal is capable of executing;

determining at least one complex command needed for the restitution of said multimedia data;

converting said at least one complex command, not present in said list, into at least one command present in said list by taking account of the list of restitution commands that the terminal is capable of executing;

transmitting, via said gateway, multimedia data by a least one sequence of commands forming part of said list of restitution commands executable by the terminal; and restitution in said terminal of said multimedia data by said received command or commands.

2. Method for the restitution of multimedia data according to claim 1, wherein said method comprises a selecting a set of at least one command to be transmitted to said terminal, from among at least two possible sets of at least one command used to perform a predetermined operation.

3. Method for the restitution of multimedia data according to claim 2, wherein said selection step takes account of statistics to determine the set of commands showing the best performance according to a predetermined criterion.

4. Method for the restitution of multimedia data according to claim 3, wherein said predetermined criterion also takes account of a piece of information representing a level of activity of said terminal.

5. Method for the restitution of multimedia data according to claim 3, wherein said method takes account of at least one of a piece of information representing said first current transmission channel or a piece of information representing an effective bit rate available between said gateway and said terminal.

6. Method for the restitution of multimedia data according to claim 3, wherein said method comprises at least two steps of restitution of the multimedia data respectively for at least two terminals simultaneously.

7. Method for the restitution of multimedia data according to claim 3, wherein said method takes account of at least one of a piece of information representing said first current transmission channel and a piece of information representing an effective bit rate available between said gateway and said terminal.

8. Gateway designed to communicate with at least one terminal capable of restituting multimedia data transmitted by said gateway, wherein said gateway comprises:

means for interrogation of said terminal by said gateway on the terminal's capabilities of restitution of said multimedia data;

means for receiving from the terminal a list of restitution commands that the terminal is capable of executing;

means for determining at least one complex command needed for the restitution said multimedia data;

means for conversion of said at least one command not present in said list into at least one command present in said list by taking account of the list of restitution commands that the terminal is capable of executing; and means for transmission of a least one sequence of commands forming part of a list of restitution commands executable by the terminal, given by this terminal.

9. Gateway according to claim 8, wherein said gateway comprises means for selection of a set of at least one command to be transmitted to said terminal, from among at least two possible sets of at least one command enabling a predetermined operation to be performed.

10. A terminal comprising:

means for restitution of multimedia data transmitted by a gateway;

means for reception of an interrogation of said terminal sent by said gateway and relative to the capabilities of restitution of said terminal;

means for transmission to said gateway of a list of restitution commands that the terminal is capable of executing; and means for receiving from said gateway, multimedia data transmitted by a least one sequence of commands forming part of said list of restitution commands executable by the terminal, said sequence of commands representing a complex command determined by the gateway for restituting the multimedia data and not present in the list, said complex command being converted by the gateway into the sequence of commands.

11. A non-transitory computer readable support containing computer program stored therein for causing a computer processor to perform a method comprising:

receiving in a terminal an interrogation sent by a multimedia data transmission gateway and relative to the capabilities of restitution of said terminal;

transmitting in said gateway a list of restitution commands that the terminal is capable of executing receiving from said gateway, multimedia data transmitted by a least one sequence of commands forming part of said list of restitution commands executable by the terminal, said sequence of commands representing a complex command determined by the gateway for restituting the multimedia data and not present in the list, said complex command being converted by the gateway into the sequence of commands.

12. A non-transitory computer readable support containing computer program stored therein for causing a computer processor to perform a method comprising:

interrogating a terminal by a multimedia data transmission gateway on the terminal's capabilities of restitution of said multimedia data to obtain a list of restitution commands that the terminal is capable of executing; and determining at least one complex command needed for the restitution of said multimedia data;

converting said at least one complex command, not present in said list, into at least one command present in said list by taking account of the list of restitution commands that the terminal is capable of executing; and transmitting a least one sequence of commands forming part of a list of restitution commands executable by the terminal, given by this terminal.

* * * * *

UNITED STATES PATENT AND TRADEMARK OFFICE
CERTIFICATE OF CORRECTION

PATENT NO. : 8,631,329 B2
APPLICATION NO. : 11/993568
DATED : January 14, 2014
INVENTOR(S) : Rouchy et al.

Page 1 of 1

It is certified that error appears in the above-identified patent and that said Letters Patent is hereby corrected as shown below:

In the Claims

Column 13:

Claim 2, line 11, delete "a" after "comprises".

Claim 8, line 48, insert --of-- after "restitution".

Column 14:

Claim 10, line 16, delete "a" and insert --at--.

Claim 11, line 30, after "executing" insert --;--.

Claim 12, line 45, delete "and".

Claim 12, line 52, delete "a" and insert --at--.

Signed and Sealed this
Thirtieth Day of June, 2015

Michelle K. Lee
*Director of the United States Patent and Trademark Office*

UNITED STATES PATENT AND TRADEMARK OFFICE
CERTIFICATE OF CORRECTION

PATENT NO. : 8,631,329 B2  Page 1 of 1
APPLICATION NO. : 11/993568
DATED : January 14, 2014
INVENTOR(S) : Rouchy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1244 days.

Signed and Sealed this
Twenty-second Day of September, 2015

Michelle K. Lee
*Director of the United States Patent and Trademark Office*